June 2, 1970   A. WINKLER   3,515,558
PHOTOGRAPHIC ROLL FILM CONSTRUCTED SO AS TO REDUCE
DEFORMATION FOG
Filed Feb. 16, 1965
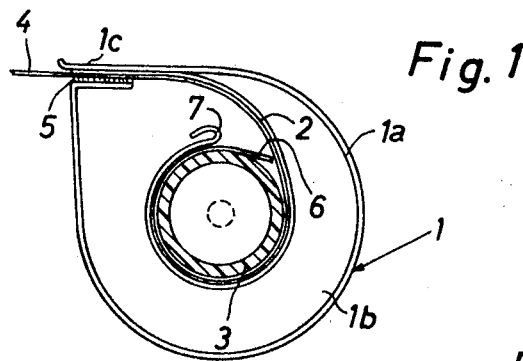
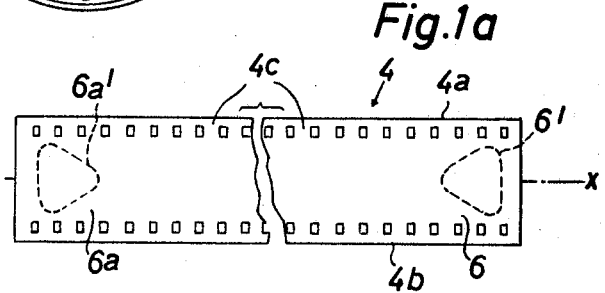
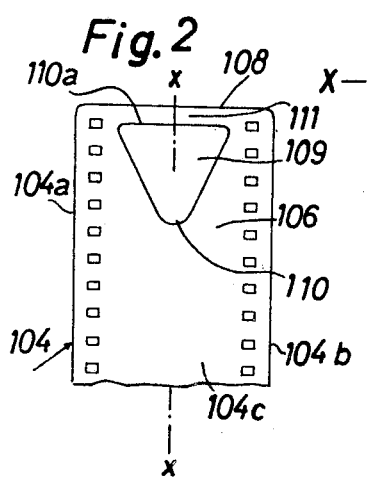
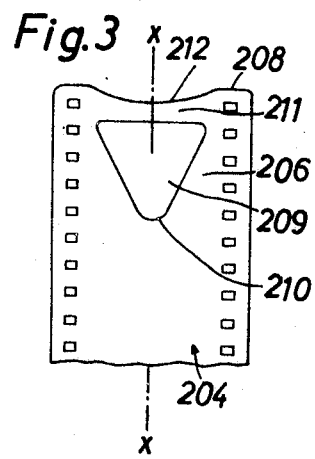
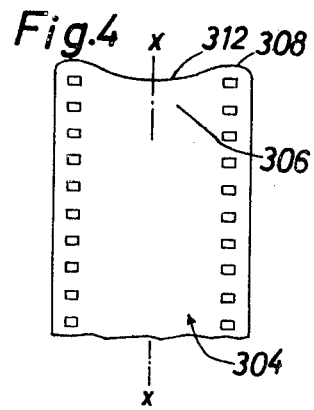
INVENTOR.
ALFRED WINKLER
BY United States Patent Office 3,515,558
Patented June 2, 1970

3,515,558
PHOTOGRAPHIC ROLL FILM CONSTRUCTED SO AS TO REDUCE DEFORMATION FOG
Alfred Winkler, Munich, Germany, assignor to Agfa Aktiengesellschaft, Leverkusen, Germany
Filed Feb. 16, 1965, Ser. No. 433,023
Claims priority, application Germany, Mar. 4, 1964, A 45,387
Int. Cl. G03c 3/02, 1/34
U.S. Cl. 96—78                                                                10 Claims

ABSTRACT OF THE DISCLOSURE

A flexible photographic roll film having two transversely extending end faces provided with recesses whose depth increases gradually from the edges toward the central symmetry plane of the film. Such recesses enhance the flexibility of the end portions. The flexibility can be further enhanced by the provision of triangular cutouts in the end portions of the film.

---

The present invention relates to photographic films in general, and more particularly to an improved photographic roll film of the type which is normally stored in film cartridges and similar containers wherein the film forms a roll. Still more particularly, the invention relates to an improved photographic roll film which is especially suited for storage in so-called spoolfree film cartridges wherein the film may be coiled without being connected to a rotary spool.

A spoolfree film cartridge normally comprises a spring which is installed in its mantle and serves to coil the leading end of a normally flat photographic film when the film is fed through the mouth of the cartridge to be transformed into a roll consisting of tightly packed superimposed helical convolutions. When the loaded cartridge is stored or shipped in warm and humid climates, any deformations which may develop in the roll remain impressed in the film and such deformations often lead to blurred pictures and other drawbacks. In hot and humid climates, the material of the film softens and is more likely to be deformed by the spring which keeps the roll from unwinding.

In order to avoid such deformation of the film roll in response to the bias of the spring, a spoolfree film cartridge often comprises a freely rotatable convoluting cylinder which may be journalled in the end walls of the cartridge and cooperates with the spring by simultaneously forming an internal backing or core for the roll. Nevertheless, it happens again and again that the film roll develops corrugations which run from the one to the other axial end thereof and whose area increases gradually from the innermost to the outermost convolution of the roll. The presence of such corrugations is due to the fact that the end portions of a customary photographic film are comparatively stiff so that, when the film is introduced into the cartridge, the front end face of the leading end strikes against and thereupon exerts a radially outwardly directed pressure upon the first complete convolution of the film to form therein a bulge or corrugation extending from the one to the other axial end of the cylinder. The next convolutions follow the outline of the innermost convolution and are deformed to a continuously increasing extent so that each outer convolution is formed with a corrugation which is more pronounced than the corrugation of the convolution therebelow. In certain climates, such deformations or corrugations are "frozen" into the film roll so that, when the film is withdrawn and a portion thereof moves in registry with the lens prior to actual exposure, the thus withdrawn portion will not lie flat and the picture will be blurred. It was found that the corrugations are most pronounced midway between the ends of the film roll because the median zone of the leading end is stiffer than the zones which are adjacent to the longitudinal edges of the film.

Accordingly, it is an important object of my invention to provide an improved photographic film which can be readily convoluted into a roll and is not likely to develop corrugations or similar deformations which could affect the quality of pictures when the film is exposed.

Another object of the invention is to provide a film which, when coiled up in a spoolfree film cartridge, is much more likely to form a roll of truly circular cross-sectional outline, i.e., which can form a roll resembling a perfect cylinder.

A further object of the invention is to provide a photographic roll film which may be stored for long periods of time, which may be transported from and into different climates, and which can be accommodated in conventional cartridges without any danger that the film would undergo such extensive deformation which is likely to affect the quality of pictures.

An additional object of the invention is to provide a film of the above outlined characteristics which can be produced at low cost, which can be produced in any desired length or width, and which can be manipulated by amateurs without any risk that such manipulation would lead to undesirable deformation when the film is fed into or withdrawn from a film cartridge.

Briefly stated, one feature of my invention resides in the provision of a flexible photographic film for use in cartridges and similar containers of the type wherein the film is convoluted to form a roll. The film comprises two parallel longitudinally extending edge portions, an elongated median portion and two short end portions, and has a symmetry plane which is normal thereto and extends midway between its edge portions. The cross-sectional area of at least one end portion diminishes in a direction from the edge portions toward the symmetry plane so that the flexibility of such end portion exceeds the flexibility of the median portion. Consequently, when the film is introduced through the mouth of a cartridge with the end portion of greater flexibility leading, such end portion of the film is more readily convoluted to allow for the formation of a circular cylindrical roll, namely, of a roll which is of truly circular cross section.

The flexibility of the one or both end portions may be increased by reducing the thickness of their material or by providing them with one or more cutouts whose area increases symmetrically from the edge portions toward the symmetry plane. For example, the cutouts may take the form of triangles or recesses provided in the end faces of the corresponding end portions.

The novel features which are considered as characteristic of the invention are set forth in particular in the appended claims. The improved photographic roll film itself, however, both as to its configuration and the method of manipulating the same, together with additional features and advantages thereof, will be best understood upon perusal of the following detailed description of certain specific embodiments with reference to the accompanying drawings, in which:

FIG. 1 is an end elevational view of a film cartridge and illustrates a portion of a photographic film which is produced in accordance with a first embodiment of the invention, one end wall of the cartridge being removed and a portion of the convoluting cylinder being shown in section;

FIG. 1a is a top plan view of the film which is shown in FIG. 1;

FIG. 2 is a fragmentary top plan view of a second film whose end portions are rendered more flexible by the provision of triangular cutouts;

FIG. 3 is a similar fragmentary top plan view of a third film whose end portions are rendered more flexible by the provision of several cutouts; and FIG. 4 is a fragmentary top plan view of a fourth film whose end portions are weakened by the provision of cutouts which take the form of recesses provided in the end faces of the end portions.

Referring first to FIG. 1, there is shown a film cartridge 1 which may be used in a 35 mm. camera. This cartridge is of the spoolfree type wherein the film may be coiled without being connected to a spool. The cartridge comprises a substantially cylindrical mantle or shell 1a, two end walls 1b (only one shown), a mouth 1c provided with a suitable light trap 5, and convoluting means including a freely rotatable cylinder or core 3 whose ends are journalled in the walls 1b and a suitably shaped spring 2 having a bent-over tip 7. The spring 2 is coiled around the major portion of the cylinder 3 and its outer end is anchored in the mantle 1a adjacent to the film trap 5. The photographic film 4 is introduced through the mouth 1c (i.e., through the light trap 5) and then slides along the inner side of the spring 2 to be directed into the gap between such spring and the peripheral surface of the convoluting cylinder 3. The film 4 is flexible and normally tends to flatten out so that its front end portion 6 tends to take a position in which it is tangential to the peripheral surface of the cylinder 3 as soon as the film is fed sufficiently to move the end portion 6 beyond the bent-over tip 7 of the spring 2. In the absence of any remedial action, the end portion 6 would cause the convolutions of the roll which is formed on continued introduction of the film 4 to develop corrugations extending in the axial direction of the mantle 1a. This will be readily understood since the end portion 6 would bend the adjacent portion of the convolution which is immediately adjacent thereto, this convolution would form a similar bulge or bend in the next-following convolution, and so forth, so that the roll would be of other than truly circular cylindrical shape. While it is true that the end portion 6 will be flexed under the bias of the spring 2, particularly if this end portion is located in a zone of the gap which is of constant width, the bias of a metallic spring is unpredictable and may change with time so that the formation of the aforementioned corrugations is very likely, particularly when the cartridge (with a roll of convoluted film therein) is transported from a warmer to a colder climate or from a dry area to a humid area. The corrugations which develop under such circumstances in response to or as a result of comparative stiffness of the front end portion 6 are highly undesirable because the film will not flatten out at the time it registers with the lens, and the corresponding part of the picture will be blurred. In other words, the corrugations are more or less permanently impressed or "frozen" in the film and affect the quality of the picture whenever such corrugations happen to be located in a portion of the film which is exposed when the user decides to take a picture.

FIG. 1a illustrates one method of avoiding such undesirable undulation of the film 4. This film comprises two straight parallel edge portions 4a, 4b, an elongated median portion 4c, and two short end portions 6, 6a. The symmetry plane X—X which extends midway between the edge portions 4a, 4b is normal to the plane of the film 4. In accordance with my invention, at least one of the end portions 6, 6a is configurated in such way that its thickness (cross-sectional area) diminishes in a direction from the edge portions 4a, 4b toward the symmetry plane X—X. As shown, both end portions are shaped in such a way, and the zones of reduced thickness are indicated by broken lines 6', 6a'. It will be seen that the zones 6', 6a' resemble islands each consisting of two halves which are mirror symmetrical with reference to the plane X—X. Consequently, the flexibility of the end portions 6, 6a exceeds the flexibility of the median portion 4c whereby the end portions are less likely to cause the formation of corrugations when the film 4 is introduced into the cartridge 1. It is clear that the zones 6', 6a' may be configurated in a number of ways without departing from the spirit of my invention. All that counts in the embodiment of FIG. 1a is that the flexibility of the one or both end portions 6, 6a should exceed the flexibility of the median portion 4c to such a degree that the thus weakened end portion or end portions will be readily flexed on introduction into the cartridge 1 and in response to engagement with the median portion 4c while such median portion advances into the gap between the spring 2 and cylinder 3.

If both end portions of the film 4 are more readily flexible than the median portion 4c, the user need not be careful in introducing the film into the cartridge 1 because it will make no difference which of the end portions is located at the leading end when the film is guided through the mouth 1c. Also, the other end portion will then prevent the formation of corrugations in the other cartridge, namely, in the so-called takeup cartridge which receives the film at the same rate at which the film is being paid out by the cartridge 1 of FIG. 1.

FIG. 2 illustrates a portion of a flexible photographic roll film 104 which is configurated in accordance with a second embodiment of my invention. The front end portion 106 of this film is rendered more flexible by the provision of a cutout resembling an isosceles triangle 109 whose apex 110 is located in the symmetry plane X—X and whose side 110a is parallel or nearly parallel to the transversely extending end face 108 of the end portion 106. Thus, the cutout 109 provides the end portion 106 with a narrow web 111 which extends along the end face 108 and which is readily flexible in response to abutment against the median portion 104c of the film 104 when the latter is introduced into the cartridge 1 in the same way as shown in FIG. 1 for the film 4. It will be seen that the cutout 109 comprises two halves which are mirror symmetrical with reference to the plane X—X so that the cross-sectional area of the end portion 106 diminishes gradually from the edge portions 104a, 104b toward the plane X—X. The end face 108 is located in a plane in which the film 104 has been severed from a large roll in a manner well known in the art. The corners of the triangular cutout 109 are preferably rounded, and it will be readily understood that the cutout 109 may resemble an equilateral triangle or another regular polygon, a circle an ellipse or another geometric body which will reduce the stiffness of the end portion 106 to such an extent that this end portion cannot cause the formation of corrugations when the film 104 is rolled up and remains stored in such condition for longer periods of time and/or is used in climates which are likely to make deformations of the film permanent.

It is further to be noted that the other end portion (not shown) of the film 104 may, and preferably is, provided with a cutout which resembles the cutout 109 or another geometric body to insure that the other end portion is also more readily flexible than the median portion 104c. The same holds true for the embodiments which are illustrated in FIGS. 3 and 4.

FIG. 3 shows a portion of a film 204 which is configurated substantially in the same way as the film 104 of FIG. 2 with the sole important exception that the end portion 206 is provided with two cutouts including a triangular cutout 209 (corresponding to the cutout 109) having an apex 210 and a second cutout 212 here shown as a recess formed in the end force 208. The recess 212 is bounded by a concave central portion of the end face 208 and its depth increases gradually from both edge portions of the film 204 toward the central symmetry plane X—X. Consequently, the thickness of the web 211 diminishes from the upper corners of the cutout 209 toward the plane X—X to render the end portion 206 even more flexible and less prone to cause the formation of corrugations when the film 204 is coiled up in a film cartridge. At this time, I consider the film 204 as being configured in accordance with a preferred embodiment of my invention. It was found that the end portion 206 can be flexed sufficiently to prevent the formation of any, even slightest, corrugations in a roll of film. Despite such strong flexibility, the end portion 206 remains stiff enough to allow for convenient insertion through the mouth of a film cartridge.

FIG. 4 illustrates a fourth embodiment of my invention according to which the end portion 306 of the film 304 is formed with a single cutout in the form of a recess 312 corresponding to the recess 212. The depth of the recess 312 in the end face 308 increases gradually in directions from the edge portions toward the symmetry plane X—X. The flexibility of the end portion 306 is somewhat less than the flexibility of the end portion 106 and substantially less than the flexibility of the end portion 206. However, even the end portion 306 can be flexed enough to avoid the formation of corrugations, at least in most instances.

The exact configuration of cutouts in the end portion of end portions of a photographic film can be determined experimentally, depending on the nature of film, on its width, on the diameter of the convoluting cylinder 3, on the bias of the spring 2, on the destination of the loaded cartridge (i.e., whether the cartridge is to be shipped to a tropical area or elsewhere), and on certain other factors. All other films of the same type will then be shaped in a manner which has been determined to constitute the best solution for a given purpose.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be secured by Letters Patent is:

1. A flexible photographic film for use in cartridges and similar containers of the type wherein the film is convoluted to form a roll, said film comprising an elongated median portion and two end portions each having a substantially transversely extending end face, at least one of said end faces having a recess which enhances the flexibility of the respective end portion.

2. A flexible photographic film as defined in claim 1, further comprising two parallel elongated edge portions and having a symmetry plane which is normal thereto and extends midway between said edge portions, the depth of said recess increasing gradually from said edge portions toward said symmetry plane.

3. A flexible photographic film as defined in claim 1, wherein the end portion having said one end face is further provided with a cutout which is adjacent to said recess.

4. A flexible photographic film as defined in claim 3, wherein said cutout is of substantially triangular outline.

5. A flexible photographic film as defined in claim 4, wherein one side of said triangular cutout is substantially parallel to said one end face and wherein said cutout has an apex which is located substantially midway between the edge portions of the film.

6. A flexible photographic film as defined in claim 1, wherein each of said end faces is provided with a recess.

7. A flexible photographic film as defined in claim 1, wherein the maximum depth of said recess is a fraction of the width of the film.

8. A flexible photographic film as defined in claim 1, wherein said one end face comprises a concave portion which bounds said recess.

9. A flexible photographic film for use in cartridges and similar containers of the type wherein the film is convoluted to form a roll, said film comprising two elongated parallel edge portions, an elongated median portion of constant cross-sectional area, and two end portions each having a transversely extending end face, said film having a symmetry plane which is normal thereto and extends midway between said edge portions, each of said end portions having at least one triangular cutout whose area increases gradually from said edge portions toward said symmetry plane so that the flexibility of said median portion is less than the flexibility of said end portions, each of said cutouts having a side which is substantially parallel with the corresponding end face and an apex located in said symmetry plane.

10. In a pressure-sensitive photographic film strip for fabrication into roll-film in which an end is overlaid by subsequent layers of said strip, said film strip having image-receiving area disposed between the edges thereof, the improvement wherein the thickness of the film strip, along at least a portion of a line adjacent the film strip end and perpendicular to the lateral edges thereof, is less than the thickness of the film strips remote from the end so that the supporting pressure is reduced in the area subjacent the image area of overlying layers of the film strip to reduce pressure marking the image area.

References Cited

UNITED STATES PATENTS 2,188,779   1/1940   Roehrl _____ 96—78

FOREIGN PATENTS 276,008   7/1930   Italy.

NORMAN G. TORCHIN, Primary Examiner

R. E. FICHTER, Assistant Examiner

U.S. Cl. X.R.

96—109